(12) United States Patent
Lam

(10) Patent No.: US 6,697,010 B1
(45) Date of Patent: Feb. 24, 2004

(54) SYSTEM AND METHOD FOR MOVING TARGET DETECTION

(75) Inventor: Larry K. Lam, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/127,607

(22) Filed: Apr. 23, 2002

(51) Int. Cl.[7] .............................................. G01S 13/90
(52) U.S. Cl. ....................................... 342/25; 342/160
(58) Field of Search .................. 342/25, 107, 175–179, 342/184–186, 104, 114, 160; 382/107

(56) References Cited

U.S. PATENT DOCUMENTS

| | | | |
|---|---|---|---|
| 5,539,408 A | * 7/1996 | Moreira et al. | 342/25 |
| 5,708,436 A | * 1/1998 | Loiz et al. | 342/25 |
| 5,721,692 A | * 2/1998 | Nagaya et al. | 345/475 |
| 5,734,737 A | * 3/1998 | Chang et al. | 382/107 |
| 5,751,243 A | * 5/1998 | Turpin | 342/179 |
| 5,805,099 A | * 9/1998 | Nagata | 342/25 |
| 5,883,969 A | * 3/1999 | Le Gouzouguec et al. | 382/103 |
| 6,081,606 A | * 6/2000 | Hansen et al. | 382/107 |
| 6,255,981 B1 | * 7/2001 | Samaniego | 342/25 |
| 6,400,306 B1 | * 6/2002 | Nohara et al. | 342/25 |
| 6,426,718 B1 | * 7/2002 | Ridgway | 342/160 |
| 2002/0126897 A1 | * 9/2002 | Ueda et al. | 382/197 |
| 2002/0168091 A1 | * 11/2002 | Trajkovic | 382/107 |

OTHER PUBLICATIONS

M. Soumekh, Synthetic Aperture Radar Signal Processing with Matlab Algorithms, John Wiley & Sons, Inc., New York, 1999, pp. 561–585.

* cited by examiner

Primary Examiner—Thomas H. Tarcza
Assistant Examiner—Isam Alsomiri
(74) Attorney, Agent, or Firm—Townsend and Townsend and Crew LLP

(57) ABSTRACT

The present invention is a system and method for radar detection of moving targets. The radar system of the present invention has only a single transmit phase center and a single receive phase center. The method of the present invention includes radiating a set of pulses to illuminate a desired scene. The pulses are reflected off of a target and a set of return signals are received. The pulse returns are then digitized, resulting in a set of data returns. Motion compensation is then performed on the entire set of data returns. A plurality of blocks of the motion compensated data are selected that are highly overlapping in time. A plurality of images is then generated from the plurality of blocks of motion compensated data. A consecutive set of the plurality of images is then selected. Lastly, moving objects represented within the consecutive set of images are identified.

19 Claims, 9 Drawing Sheets

SYSTEM AND METHOD FOR MOVING TARGET DETECTION

FIELD OF THE INVENTION

The present invention relates to a radar system and method for detecting moving targets. More specifically, the present invention relates to a synthetic aperture radar (SAR) system for identifying moving targets from a set of data returns received at a single receive phase center.

BACKGROUND OF THE INVENTION

Aircraft-borne radar systems have been designed in the past as ground mobile target indicators (GMTI). An airborne GMTI radar system radiates a plurality of electromagnetic pulses to illuminate a specific area on the ground. These pulses reflect off of moving targets as well as stationary clutter and targets. The reflected pulses are received by the radar system. The received pulses are processed by the radar system to reject stationary clutter and targets, and detect moving targets.

A conventional GMTI radar system utilizes multiple antennas to accomplish moving target detection. The number of antennas varies from 3 to 8. These antennas could be separate dish antennas, or different parts of a phased array antenna system. In the transmit mode, one of these antennas radiates from a transmit phase center. In alternative transmit modes, all or a selected group of the antennas radiate coherently together. In other words, they act as a single larger antenna with a single transmit phase center. The transmit phase center is the point from which the outward spreading electromagnetic pulses would seem to have originated, as seen by an observer from a distance. When the radar system radiates, there is a single transmit phase center, the location of which is controlled by electrical means and is not necessarily at the spatial center of the transmit antennas.

In the receive mode, the 3–8 antennas receive the reflected pulses as separate antennas. In other words, the antennas deliver separate outputs corresponding to different receive antenna phase centers. The separation of moving targets from stationary clutter is a key objective of a GMTI radar system. A variety of implementations have been demonstrated to meet this objective, and to meet a variety of other system requirements. Some of these implementations are referred to as Synthetic Aperture Radar (SAR) processing, Doppler Radar processing, Displaced Phase Center Antenna (DPCA) processing, and Space Time Adaptive Processing (STAP). A discussion of DPCA and SAR based moving target detection is given by Mehrdad Soumekh, "Synthetic Aperture Radar Signal Processing with MATLAB Algorithms," John Wiley & Sons, Inc., New York, 1999, page 561 to 585.

Conventional implementations of a GMTI radar system require multiple separate receiving antennas. Described as follows are two conventional methodologies for performing GMTI. The first methodology for performing GMTI relies on achieving clutter rejection based on spatial correlation between received pulses. The second methodology for performing GMTI relies on achieving clutter rejection based on both spatial and temporal correlation of consecutive received pulses.

The first methodology for performing GMTI will be described with respect to a conventional GMTI radar system that is designed to synthesize a very large array antenna, using an aircraft that flies along a straight line. This is a basic configuration of synthetic aperture radar (SAR). The SAR radiates from different locations along the flight path of the aircraft. These locations are denoted by $\{s_1, s_2, s_3, s_4, \ldots, s_n, \ldots\}$, which denotes a set of closely spaced points along a straight line. The motion of the aircraft causes the transmit phase center of the GMTI radar system to pass through these points. When the transmit phase center of the radar system is aligned with one of these points, the radar radiates a pulse. Since the aircraft flies at a constant velocity, the radar radiates at regular intervals.

The pulse repetition frequency (PRF) of the radar and the velocity of the aircraft are chosen so that the reflected pulses would be arriving at the radar in a proper manner, described as follows.

FIG. 1A depicts a GMTI radar system 100 that has 5 antennas with phase centers denoted by $c_0, c_1, c_2, c_3$, and $c_4$. The radar system selects the phase center denoted by $c_3$ as the transmit phase center and radiates a pulse from all 5 antennas. At the time of radar transmission the antenna phase centers are aligned with the locations $\{s_{98}, s_{99}, s_{100}, s_{101}, s_{102}\}$. Thus, the radar effectively radiates a pulse from the location $s_{101}$. A short interval later, the reflected pulse arrives.

FIG. 1B illustrates a short time later when the reflected pulse is received back by the radar. By the time the aircraft radar system receives the reflected pulse, the aircraft has moved forward, and the phase centers of the antennas, $\{c_0, c_1, c_2, c_3, c_4\}$, are aligned with $\{s_{99}, s_{100}, s_{101}, s_{102}, s_{103}\}$. The radar system uses these antennas to receive the reflected pulse. Each of the five antennas detects radiation, generating five receive "outputs" or "channels". The output from the receiving antenna at $c_2$ is denoted the mono-static SAR signal The terminology "mono-static" refers to the notion that the location for the transmission of the out-going pulse (or subsequent out-going pulses) and the reception of the reflected pulse (or subsequent reflected pulses) are the same. The outputs from other receive channels are denoted bi-static SAR signals. The terminology "bi-static" refers to the arrangement where the locations for transmit and receive are different. For example, the signal received by antenna C2 in FIG. 1B is a mono-static signal because it is received allocation S101 and the pulse was effectively radiated from location S101 (shown in FIG. 1A). The signals received by antennas C0, C1, C3, and C4 in FIG. 1B are bi-static signals.

The mono-static SAR signal is used to construct an image of the target area based on SAR processing. The resultant image is denoted a mono-static SAR image. The bi-static outputs are used to construct bi-static SAR images. If the clutter and targets in the area illuminated by the radar system are stationary, then it can be shown that any one of the bi-static SAR images could be used to produce an estimate of the mono-static SAR image, or vice versa.

Since multiple bi-static images are available, they can be combined to produce a good estimate of the mono-static image. The stationary clutter or targets that appear in the mono-static SAR image can be suppressed or substantially eliminated by subtracting the mono-static SAR image by an estimated version of the mono-static SAR image. The result of subtracting two images is another image, where the image features due to stationary clutter and targets are substantially diminished but the image features due to moving targets are enhanced.

For clarity of discussion, the above example ignored a practical matter. When the receive antennas $\{c_0, c_1, c_2, c_3, c_4\}$, are aligned with $\{s_{99}, s_{100}, s_{101}, s_{102}, s_{103}\}$ as in FIG. 1B and are configured to receive, the above example implies that the GMTI radar system is configured to radiate a pulse at the same time, so that subsequently, another reflected pulse would arrive at a later time. In practice, a GMTI radar system would not radiate and receive at the same time, rather radar pulses should be radiated between intervals of reception.

In summary, a first conventional GMTI radar system and method is comprised of several receive antennas. Several SAR images are produced using the signals received by spatially separated antennas. At one of the intermediate data processing steps, one SAR image is produced using the data from a specific receive channel (the mono-static signal), and an estimated version of the SAR image is produced using the data from the other receive channels. Clutter rejection is achieved by taking the difference of the two images. This approach to clutter rejection is based on the correlation that exists between the outputs of spatially separated receive antennas.

A second approach to achieving clutter rejection is based on the temporal correlation that exists in consecutively received pulses. Both spatial and temporal correlation may be utilized in a combined algorithm as the following example illustrates.

FIGS. 2A–2C depict a GMTI radar system 200 that has 5 antennas with phase centers denoted by $c_0$, $c_1$, $c_2$, $c_3$, and $c_4$. As shown in FIG. 2A, radar system 200 is programmed to radiate from the transmit phase center $c_2$. As shown in FIG. 2B, when the antennas $c_0$, $c_1$, $c_2$, $c_3$, and $c_4$ are aligned with the locations $s_{98}$, $s_{99}$, $s_{100}$, $s_{101}$, $s_{102}$, a reflected pulse arrives and the radar system records the outputs from the antenna, and denotes the data $x_0(98)$, $x_1(99)$, $x_2(100)$, $x_3(101)$, and $x_4(102)$. The subscripts 0, 1, 2, denote the spatially separated receive channels. The indices 98, 99, 100, 101, 102 denote the time increments in time along slow-time dimension. Slow-time refers to the time dimension marked by a pulse repetition interval (PRI), which is the reciprocal of PRF. After one pulse repetition interval, the aircraft has traveled forward and the antennas are aligned with $s_{99}$, $s_{100}$, $a_{101}$, $s_{102}$, and $s_{103}$, as shown in FIG. 2C. The radar receives another reflected pulse. The outputs are denoted $x_0(99)$, $x_1(100)$, $x_2(101)$, $x_3(102)$, and $x_4(103)$. A matrix of data is assembled, as illustrated by:

$$\begin{array}{ccccc}
x_0(k-4) & x_1(k-3) & x_2(k-2) & x_3(k-1) & x_4(k) \\
x_0(k-3) & x_1(k-2) & x_2(k-1) & x_3(k) & x_4(k+1) \\
x_0(k-2) & x_1(k-1) & x_2(k) & x_3(k+1) & x_4(k+2) \\
x_0(k-1) & x_1(k) & x_2(k+1) & x_3(k+2) & x_4(k+3) \\
\vdots & \vdots & \vdots & \vdots & \vdots \\
x_0(98) & x_1(99) & x_2(100) & x_3(101) & x_4(102) \\
x_0(99) & x_1(100) & x_2(101) & x_3(102) & \\
x_4(103) & & & & \\
x_0(100) & x_1(101) & x_2(102) & x_3(103) & \\
x_4(104) & & & & \\
\vdots & \vdots & \vdots & \vdots & \vdots
\end{array}$$

Each column in the above table is referred to as a channel of data. An SAR image can be created from any one of the channels of data. The five channels of data $x_0$–$x_4$ have a high degree of correlation among them. A space-time linear backward forward prediction data model may be constructed to predict $x_2(k)$ based on data from $x_0(k)$ and $x_1(k)$. The data model for predicting $x_2(k)$ based on $x_0(k)$ and $x_1(k)$ is:

$a_0 x_0(k-3) + a_1 x_1(k-2) + a_2 x_0(k-2) + a_3 x_1(k-1) + a_4 x_0(k-1) + a_5 x_1(k) = x_2(k)$.

The set of coefficients $\{a_0, a_1, a_2, a_3, a_4, a_5\}$ is a solution to the above equation for a single value of k. An error function, $E_a$, may be defined:

$$E_a = \sum_k \left| \begin{array}{l} a_0 x_0(k-3) + a_1 x_1(k-2) + \\ a_2 x_0(k-2) + a_3 x_1(k-1) + \\ a_4 x_0(k-1) + a_5 x_1(k) - x_2(k) \end{array} \right|^2, k = 1, 2, 3, \cdots, N.$$

The desired solution is that which minimizes the error function $E_a$ for a range of k values. The solution $\{a_n\}$ denotes the coefficients that may be used to predict the data $x_2$ using the data $x_0$ and $x_1$.

A similar solution, denoted $\{b_n\}$, may be developed to predict $x_2$ using the data from the $x_3$ and $x_4$ channels. A data model is:

$b_0 x_3(k) + b_1 x_4(k+1) + b_2 x_3(k+1) + b_3 x_4(k+2) + b_4 x_3(k+2) + b_5 x_4(k+3) = x_2(k)$, and a desired solution $\{b_n\}$ may obtained by minimizing the error function, $E_b$, $$E_b = \sum_k \left| \begin{array}{l} b_0 x_3(k) + b_1 x_4(k+1) + \\ b_2 x_3(k+1) + b_3 x_4(k+2) + \\ b_4 x_3(k+2) + b_5 x_4(k+3) - x_2(k) \end{array} \right|^2, k = 1, 2, 3, \cdots, N.$$

Using $\{a_n\}$ and $\{b_n\}$, two versions of the $x_2$ channel may be predicted, as denoted by $x_{2a}$ and $x_{2b}$. The results are three channels of data, $x_{2a}$, $x_2$ and $x_{2b}$. Subsequently three SAR images corresponding to these channels may be constructed. Clutter rejection can be obtained by take the difference between two of images constructed using the data from these channels.

In summary, a second conventional GMTI/clutter suppression approach has been described. Two estimates of the "center" channel SAR signal, $x_2$, are produced from a SAR with multiple receive antennas. The estimates, $x_{2b}$ and $x_{2a}$ may be referred to as "early" and "late" channels. The "center" channel SAR signal, $x_2$, is used to produce a "center" channel SAR image. Subsequently, the "early" and "late" channels are used produced using two estimates of the "center" channel SAR image. These estimates are denoted "early" and "late" estimates of SAR images. Clutter rejection is obtained by taking the difference using two of the three SAR images or some linear combination of these images.

The two conventional GMTI methodologies just described must overcome several challenges. First, the aircraft does not fly along a desired flight path precisely as prescribed. Second, different antennas and receivers on a GMTI radar system do not have an identical response. The aircraft motion, and channel-to-channel mismatch must be overcome before a GMTI radar system can operate properly. The effects due to aircraft motion are corrected by one or more processes, collectively referred to as motion compensation. The effects due to channel-to-channel mismatch are corrected by one or more processes, collectively referred to as radar calibration.

The space-time backward forward linear prediction data model represents an approach to compensate for the effects of channel-to-channel mismatch. The subject of we motion compensation is covered in a number of text books. Two examples are Chris Oliver and Shaun Quegan, "Understanding Synthetic Aperture Radar Images," Artech House, Boston, 1998, and Walter G. Carrara, Ron S. Goodman and Ronald M. Majewski, "Spotlight Synthetic Aperture Radar Signal Processing Algorithms" Artech House, Boston, 1995.

The conventional GMTI implementations described above require multiple receive antennas with different phase centers, from which multiple channels of SAR signals are collected, and multiple SAR images are constructed. Clutter rejection is obtained by taking the difference of the SAR images. What is needed is a system that can overcome the problems associated with channel-to-channel mismatch of the conventional GMTI radar system, and thereby simplify the radar calibration requirements. What is also needed is a system that is lower in cost, size, weight and power than the conventional GMTI radar system.

SUMMARY OF THE INVENTION

The present invention is a system and method for radar detection of moving targets. The radar system of the present invention has only a single transmit phase center and a single receive phase center. In other words, only a single channel of received data is utilized. The present invention thus eliminates the problems associated with channel-to-channel to mismatch, thereby significantly reducing the cost of the GMTI radar system and making the radar system substantially easier to calibrate. Additionally, the reductions in size, weight and power achieved with the present invention can be significant.

The method of the present invention includes radiating a set of pulses to illuminate a desired scene. The pulses are reflected off of a target and a set of return signals are received. The pulse returns are then digitized, resulting in a set of data returns. Motion compensation is then performed on the entire set of data returns. A plurality of blocks of the motion compensated data are selected that are highly overlapping in time. A plurality of images is then generated from the plurality of blocks of motion compensated data. A consecutive set of the plurality of images is then selected. Lastly, moving objects represented within the consecutive set of images are identified.

The moving objects are identified by first extracting a time series of reflection coefficients for at least some of the pixel locations of the consecutive set of images, producing a pixel function for each pixel, thereby representing the consecutive set of images by a collection of pixel functions. Next, the linear phase component from each pixel function is removed, producing phase-compensated pixel functions. Next, a high pass filter is applied to each phase-compensated pixel function, and the output of the filtered pixel function is integrated to produce a corresponding pixel value. Finally, possible moving objects are selected by identifying pixels with pixel values greater than a predetermined threshold.

DETAILED DESCRIPTION OF THE INVENTION

The present invention utilizes a GMTI radar system with a single transmit phase center and a single receive phase center. In other words, only a single channel of SAR signal is utilized. The present invention thus eliminates the problems associated with channel-to-channel to mismatch, thereby substantially reducing the cost of the GMTI in radar system and making the radar system substantially easier to calibrate. Additionally, the reductions in size, weight and power achieved with the present invention can be significant.

Figure 1A:
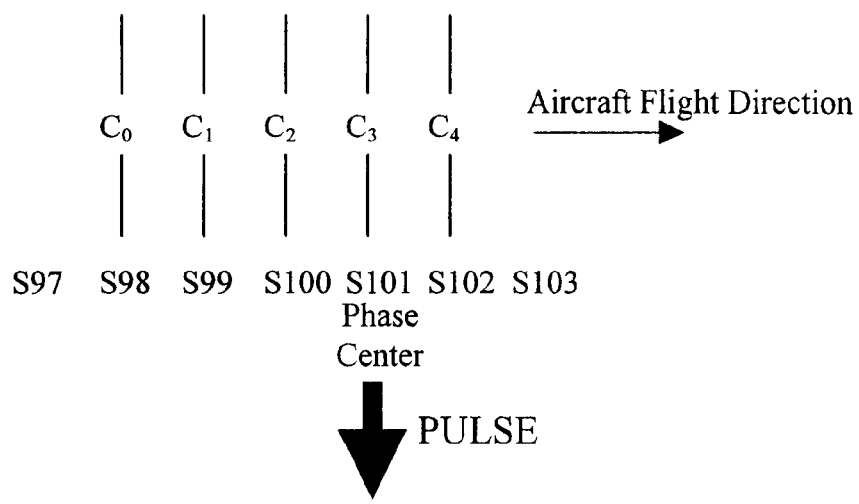
FIG. 1A illustrates a GMTI radar system 100 that has 5 antennas with phase centers denoted by $c_0$, $c_1$, $c_2$, $c_3$, and $c_4$.
Figure 1B:
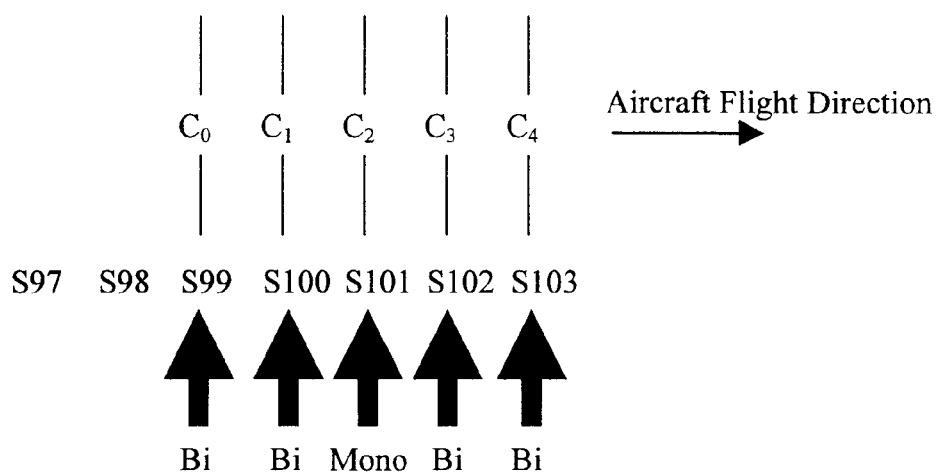
FIG. 1B illustrates a short time later when the reflected pulse is received back by the radar.
Figure 2A:
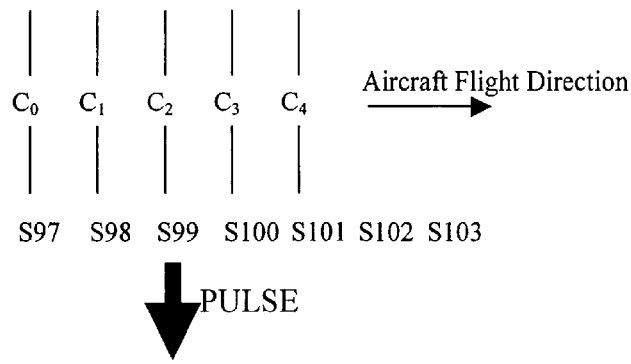
FIGS. 2A–2C illustrate a GMTI radar system 200 that has 5 antennas with phase centers denoted by $c_0$, $c_1$, $c_2$, $c_3$, and $c_4$.
Figure 2B:
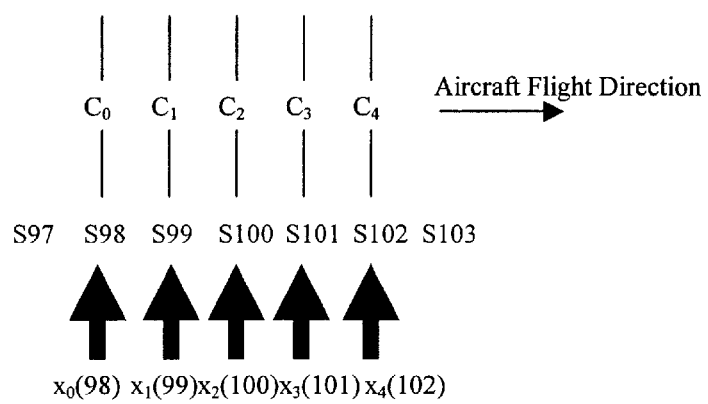
Figure 2C:
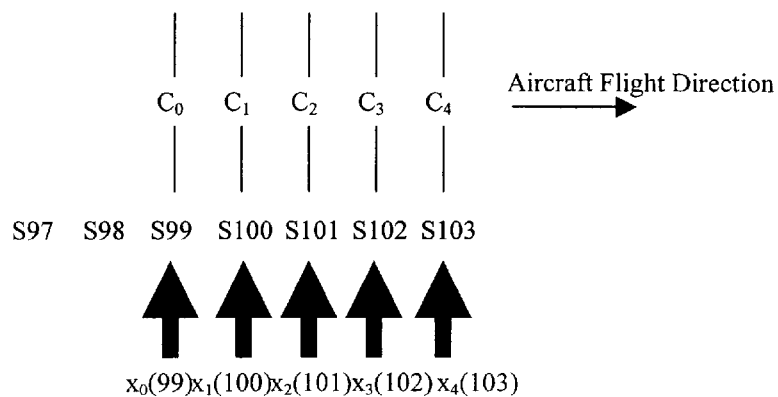
Figure 3:
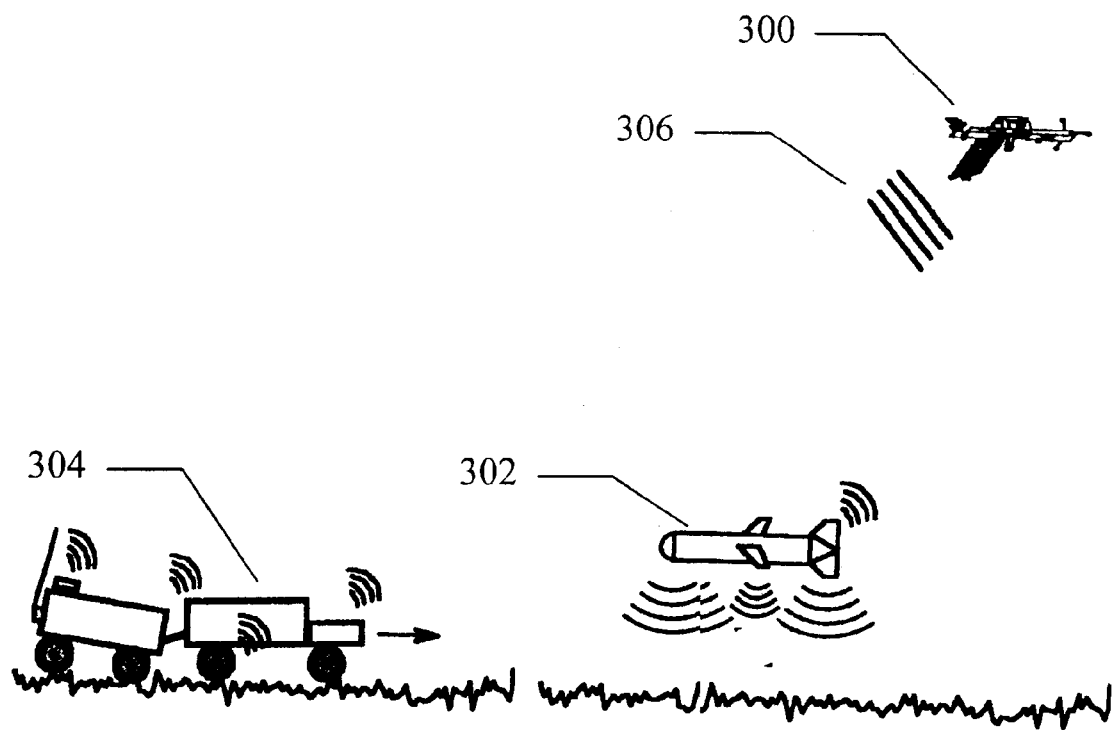
FIG. 3 illustrates a typical radar system for detecting moving targets.

FIG. 3 depicts a typical radar system for detecting moving targets. The radar system 300 is carried by an airborne platform such as an airplane. Radar system 300 emits pulses of radiation 306 towards the ground. There are moving targets on or near the ground such as flying cruise missile 302 and vehicle 304. Pulses of radiation 306 are reflected from moving targets 302 and 304, as well as the ground and stationary objects on the ground. Radar system 300 receives reflected pulses which are reflected back towards radar system 300.

A basic description SAR image processing is given below to note several key points that are relevant to the present invention. The outputs of a single channel synthetic aperture radar is denoted by $x(1)$, $x(2)$, $x(3)$, ..., $x(n)$, ..., $x(N)$, .... The index, n, is an index for the slow-time dimension. It denotes the output from the $n^{th}$ reflected pulse. A scene on the ground can be illuminated by transmitting N pulses and receiving the reflected returns. A SAR image may then be constructed from the data $\{x(1), x(2), x(3), ..., x(n), ..., x(N)\}$.

The first point to be noted is that the cross range resolution of an SAR image is a function of the number of pulses used in the construction of the image. For clarity of discussion, numerical cases are given. Consider an example where the total cross range width of the SAR image is 5 miles (29,100 feet) wide. If the number of data pulses used to construct the SAR image is large, say, if N=4096, then the cross range resolution of the image would be approximately 7 feet (29,100/4096). If N is a smaller number, say, N=256, then the cross range resolution of the image would be more than 100 feet.

It is well known that a stationary target would appear in the cross range cell that represents its actual location along the cross range dimension of the SAR image. For example, suppose a scene on the ground is illuminated by transmitting 4096 pulses (N=4096) and receiving the reflected returns. An SAR image of the scene can be created using the returns from all 4096 pulses. Consider a stationary target that would appear at a location corresponding to 1 mile from the edge of the SAR image along the cross range dimension. In this case, the target should appear in the 819th cross range resolution cell, for N=4096.

An SAR image of the scene can also be created by using a subset of the 4096 pulse returns. For example, the first 256 of the 4096 pulse returns could be used to create an SAR image of the scene. In this case, N=256, and the target will appear in the $52^{nd}$ cross range resolution cell. An SAR image of the scene can also be created by using a different block of 256 pulses of data. For example, if the 256 pulse returns are taken from the middle portion of the available 4096 pulses of data, the stationary target would still appear at the $52^{nd}$ cross range cell in the resultant SAR image.

Another point to be noted is that a moving target would appear in a SAR image but at an apparent cross range location that is displaced relative to its actual cross range location. The amount of cross range displacement is a function of the velocity of the moving target. The image features associated with a moving target would be "smeared". This terminology refers to fact that the image features of a moving target do not resemble the image features of the same target that is not moving. In addition the image features of a moving target would extend over a larger range of cross range cells than the cross range extends of the image features of the same target at rest.

In summary, the cross range locations of the image features associated with a moving target depend a great deal on which specific block of data has been selected to form the SAR image. In other words, the apparent cross range location of a moving target depends on the specific data block that has been selected to form the image. That is because the actual position of the target, as well as the actual velocity and motion dynamic of the target when the data is collected depend on time of data collection.

It follows that useful information can be obtained by forming a sequence of SAR images using the data from SAR with a single receive channel. The image features associated with stationary objects should appear substantially similar from one image to another. However, the image features associated with moving targets should vary from one image to another. As a result, it is possible to detect the presence of a ground moving target by examining a sequence of SAR images. The details of how this can be accomplished are the subject of present invention.

Figure 4:
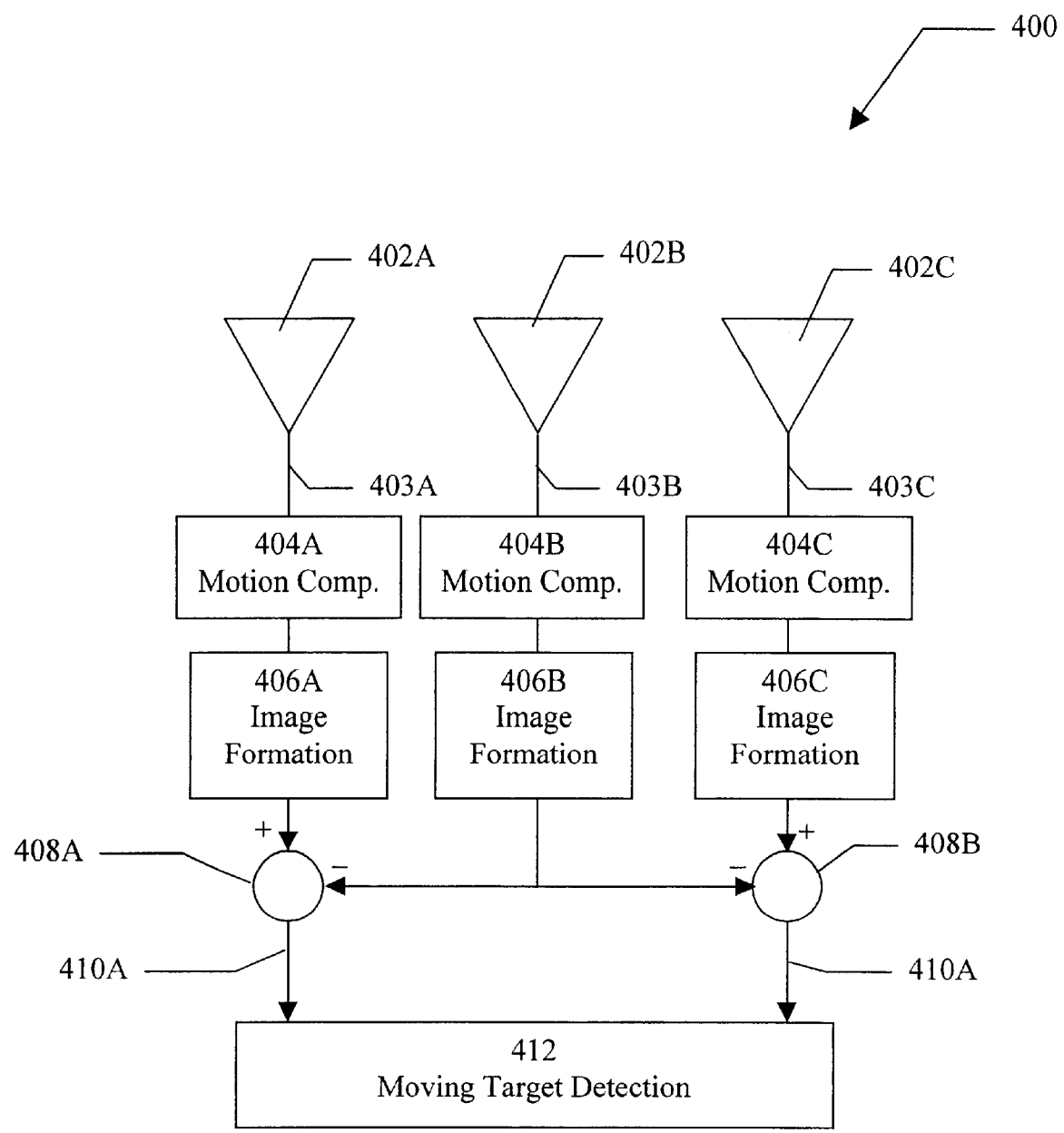
FIG. 4 is a block diagram illustrating a conventional method of detecting moving targets with an aircraft using three antenna apertures 402A, 402B, and 402C.

In order to explain the system and method of the present invention, first a block diagram illustrating a conventional GMTI system is shown in FIG. 4. FIG. 4 depicts a block diagram illustrating a conventional method of detecting moving targets with an aircraft using three antenna apertures 402A, 402B, and 402C. Antenna apertures 402A, 402B, 402C are arranged in a line parallel to the direction of travel of the aircraft housing the system. Each of antenna apertures 402emits a series of radiation pulses. The pulses are reflected off of a target and received back by antenna apertures 402. The reflected pulses received at antenna apertures 402A, 402B and 402C are designated as reflected pulse outputs 403A, 403B, and 403C, respectively. Reflected pulse outputs 403A, 403B, and 403C, are digitized and then motion compensated separately by motion compensation elements 404A, 404B, 404C, respectively. Motion compensation elements 404 electronically compensate the data to eliminate the effects of bumpy motions of the aircraft. The three outputs of motion compensation elements 404 are each processed separately by image formation elements 406A, 406B, 406C to form three images. Clutter is suppressed by a subtraction between images from adjacent channels. The subtraction is provided by difference elements 408A and 408B, producing two clutter-suppressed images 410A and 410B, respectively. Moving target detection element 412 performs moving target detection by comparing the two clutter-suppressed images 410. Additional parameters associated with the target may be extracted from images 410.

Figure 5:
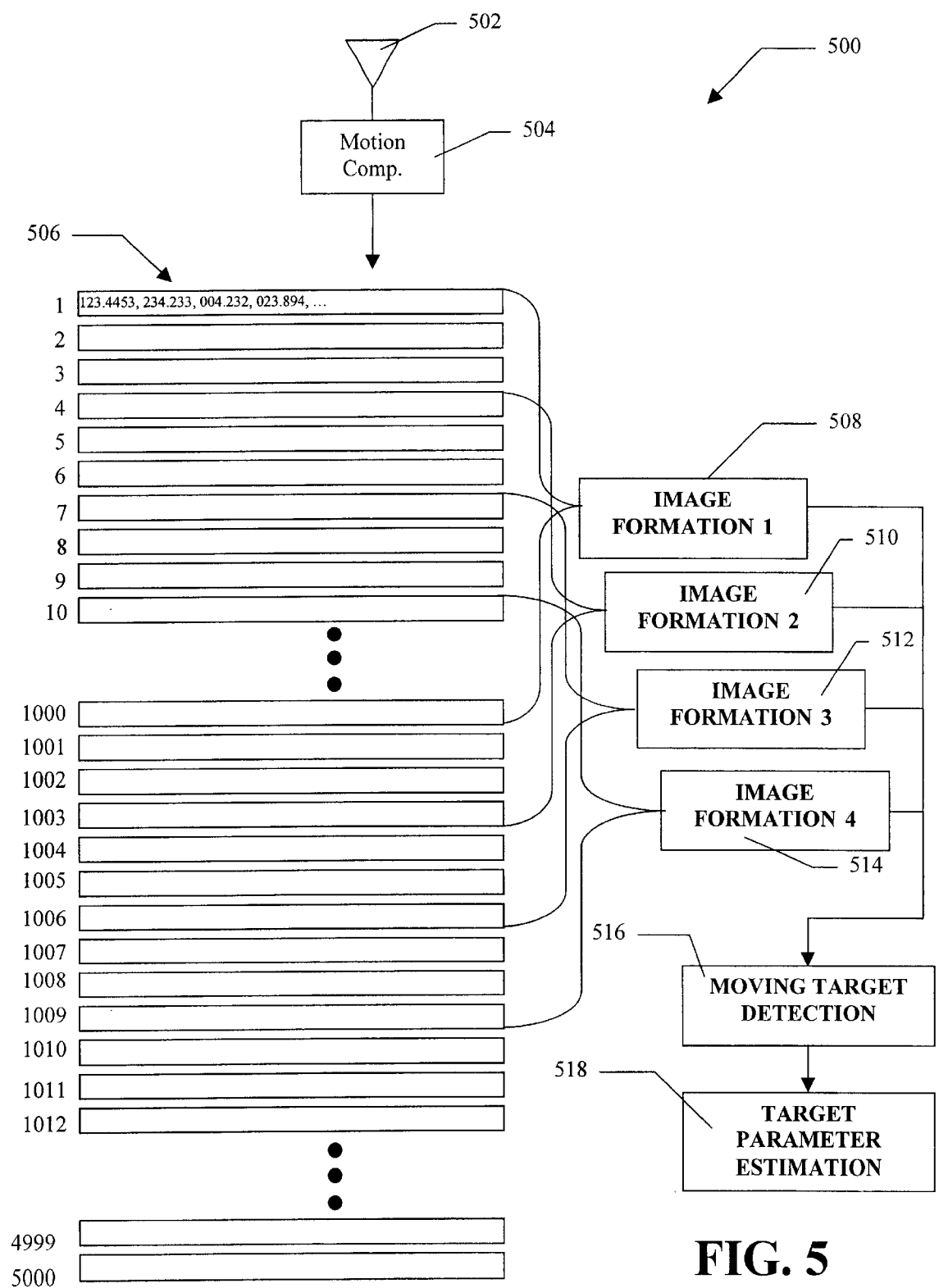
FIG. 5 is a block diagram illustrating the system 500 and method of the present invention for detecting moving targets.

FIG. 5 depicts a block diagram illustrating the system 500 and method of the present invention for detecting moving targets. The system 500 uses a single antenna 502 producing a single output radiation pulse stream, as opposed to the conventional system shown in FIG. 4 that uses three output streams produced by three antenna apertures 402a, 402b, and 402c. In one embodiment of the present invention, the radar system is a synthetic aperture radar (SAR).

A series of pulses are radiated to illuminate a desired scene. The pulse returns are received by antenna 502and digitized. This produces a set of data representing digitized pulse returns. This entire set of data is then provided to motion compensation element 504.

Motion compensation element 504 performs coordinate transformation and motion compensation using well known algorithms. Motion compensation element 504 processes the SAR data set as a whole during coordinate transformation, and the entire resultant data set is motion compensated in a single step.

To perform the moving target detection method of the present invention, an SAR data set of pulse returns may be used that is larger than conventionally used for SAR imaging. However, the SAR data set that is motion compensated as a whole needed not be extraordinarily large. A block of data that is about same size or twice as large as the nominal data block size for forming a high resolution SAR image will suffice. For example, a SAR data set representing the returns of 4096 pulses could be motion compensated within a single step.

After the reflected pulse data set has been motion compensated, a series of overlapping images is generated. Generating highly overlapping images allows a better animation of the events on the ground to be created, and provides for improved detection of ground targets. When a reflected pulse is received and digitized by the radar, the result is a series of digitized numbers. For example, digitizing a single pulse could produce 1000 numbers, or 2000 numbers, etc.

FIG. 5 shows a series of rows 506. Each of rows 506 represents a reflected pulse which has been received by the radar and digitized. As an example, each row could represent 1000 numbers. Row 1 in FIG. 5 depicts some numbers within the row for purposes of illustration.

FIG. 5 depicts an example where 5000 rows have been digitized. This total data set of 5000 digitized pulse returns will be referred to as the "tape." The tape is really a matrix of numbers. In this example, the tape would be a matrix with a row width of 1000 and a column height of 5000. The dimension along a row is referred to as the "fast-time" dimension. The dimension along the column is referred to as the "slow-time" dimension. It will be understood by one of skill in the art that a wide variation of numbers could be used. For example, the row width could be 10,000 and the column width 5,000.

Rows 506 represent a series of consecutive pulses that have been emitted by antenna 502, reflected off the ground or target and received back by the antenna 502. These consecutive pulse returns represent an animation of what is happening on the ground, analogous to a photographer with a camera taking a series of photographs, one after the other.

The system of the present invention improves the ability to distinguish moving targets by generating a series of overlapping images. An image is formed by processing a series of consecutive rows (i.e. digitized pulses). FIG. 5 illustrates an example where rows 1–1000 are processed by image formation element 508 to form a first image. Then, rows 4–1003 are processed by image formation element 510 to form a second image. Rows 7–1006 are processed by image formation element 512 to form a third image. Rows 10–1009 are processed by image formation element 514 to form a fourth image. This process continues for successive images to generate a large set of highly overlapping images. After the overlapping images have been generated, moving targets can be detected by moving target detection element 516 which compares successive images. Target parameter estimation 518 is then performed.

The radar system of the present invention has several advantages over conventional radar systems. First, the radar system of the present invention is less costly because it only uses a single antenna. Second, the radar system of the present invention is simpler in manufacture and easier to calibrate. Conventional radar systems for detecting moving targets use multiple antennas which have to work together in a coherent and synchronous fashion. The antennas each have to be pointing in the same area with precise timing between operation the antennas. This requires precise calibration which can be complicated and can introduce errors. The present invention uses a single antenna with a single output radiation pulse stream which allows for simpler calibration, manufacture, and operation.

Figure 6:
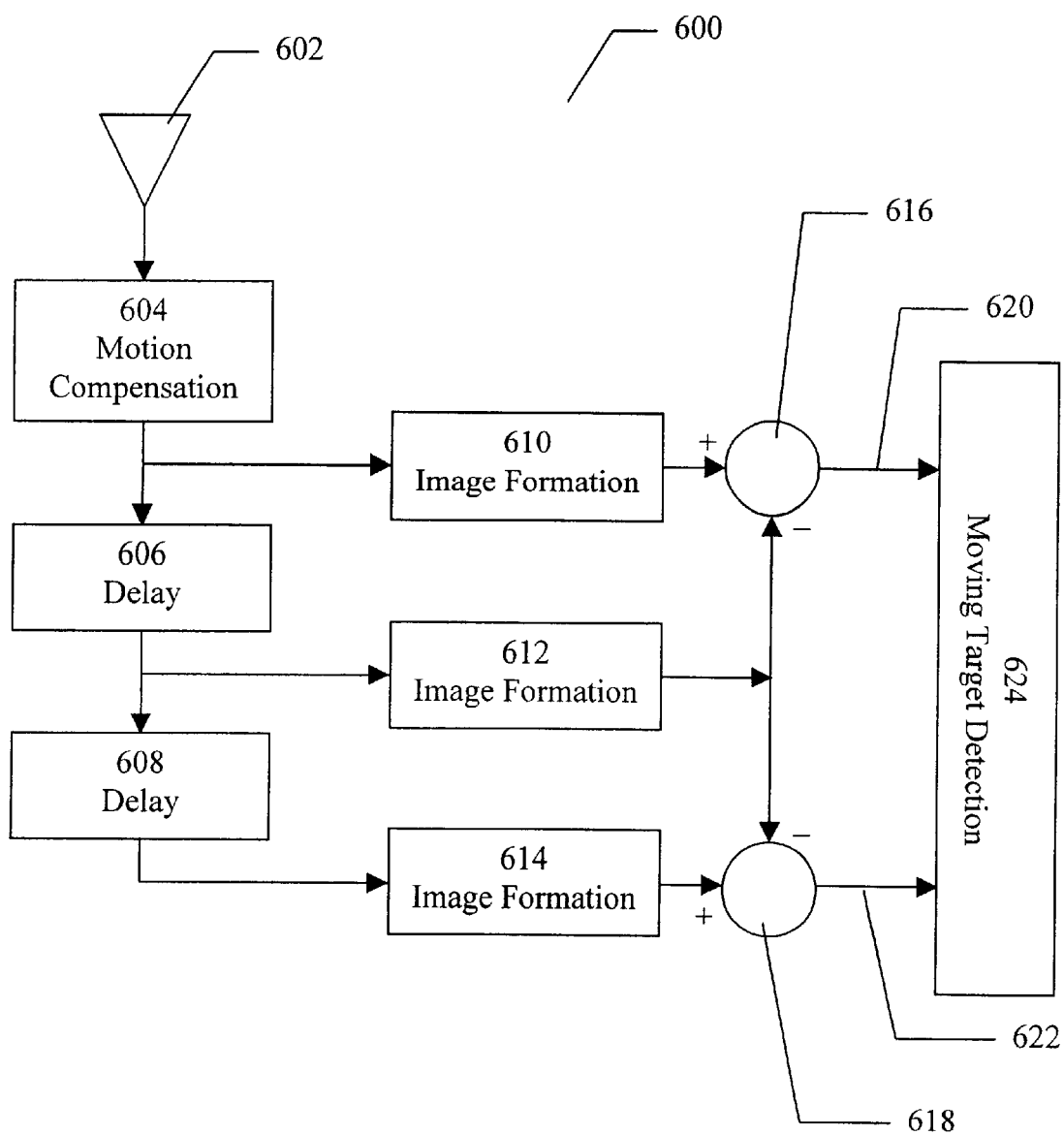
FIG. 6 illustrates the method just described in the form of a block diagram.

FIG. 6 depicts the method just described in the form of a block diagram. Antenna 602 emits a series of radiation pulses which is reflected off of a target. The reflected pulses are received by antenna 602. The received pulses are then digitized. The entire digitized pulse stream results in a large data set or "tape." The entire data set is motion compensated by motion compensation element 604.

After the reflected pulse data has been motion compensated, three overlapping sets of data are generated by delay elements 606 and 608. FIG. 6 only illustrates two delay elements for simplicity. In reality, many delay elements can be used to generate many overlapping sets of data.

The overlapping sets of data are then formed into three overlapping images by image formation elements 610, 612, and 614. Clutter is suppressed by a subtraction between images from adjacent channels, performed by difference elements 616 and 618. This produces two clutter-suppressed images 620 and 622. Moving target detection element 624 performs moving target detection by comparing the clutter-suppressed images 620 and 622. Additional parameters associated with the target may also be extracted from images 620 and 622.

Note that the conventional system illustrated in FIG. 4 suppresses stationary clutter by comparing images from spatially separated channels. The spatially separated channels represent the outputs from separate receive antennas (402A–402C). In comparison, the system of the present invention illustrated in FIGS. 5 and 6 suppresses stationary clutter by comparing images from a single channel. The present invention generates the images from the pulse returns received at a single antenna. The different images are defined by time delays rather than by the spatial separation of antennas.

Another significant difference between the present invention and the conventional system is that the present invention uses a single motion compensation step 504/604 that is applied to the whole set of pulse return data. In contrast, the conventional system illustrated in FIG. 4 must perform a separate motion compensation step (404A–404C) for each individual antenna, and each motion compensation step is operating on only a subset of the entire SAR data set. For example, in FIG. 4, motion compensation element 404A is only performing motion compensation on one third of the entire set of pulse returns (i.e. those returns received by antenna aperture 402A).

Figure 7:
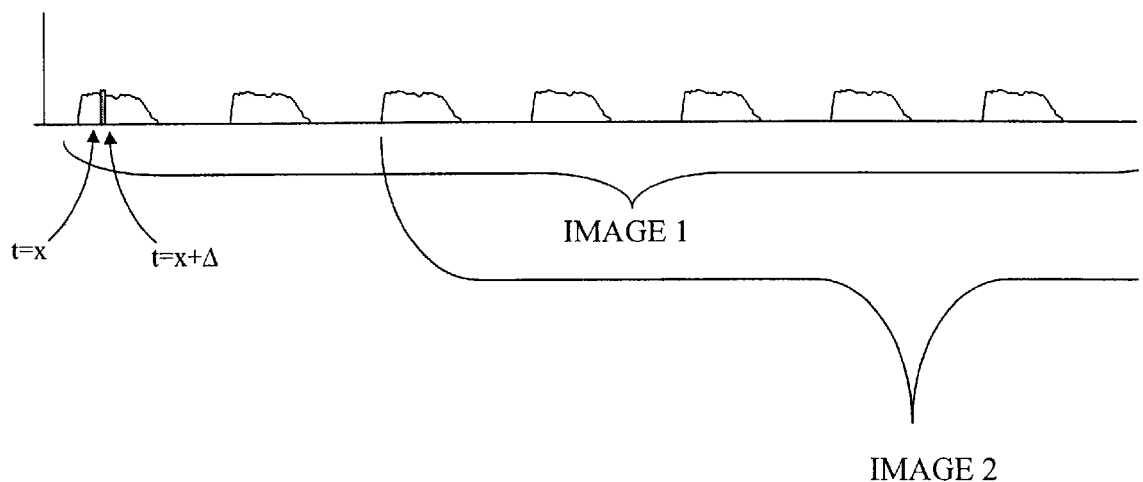
FIG. 7 illustrates a series of example pulse returns.

FIG. 7 illustrates a series of example pulse returns. Each pulse is digitized by detecting the amount of received radiation between a time t=x and t=x+Δ. This is performed repeatedly to convert the received pulses into a tape of numbers. As an example, each pulse could be digitized into a thousand numbers. FIG. 7 illustrates that IMAGE 2 is overlapping with IMAGE 1. IMAGE 1 begins with pulse 1 and could end with pulse 1000, for example. IMAGE 2 begins with pulse 3 and could end with pulse 1002.

Figure 8:
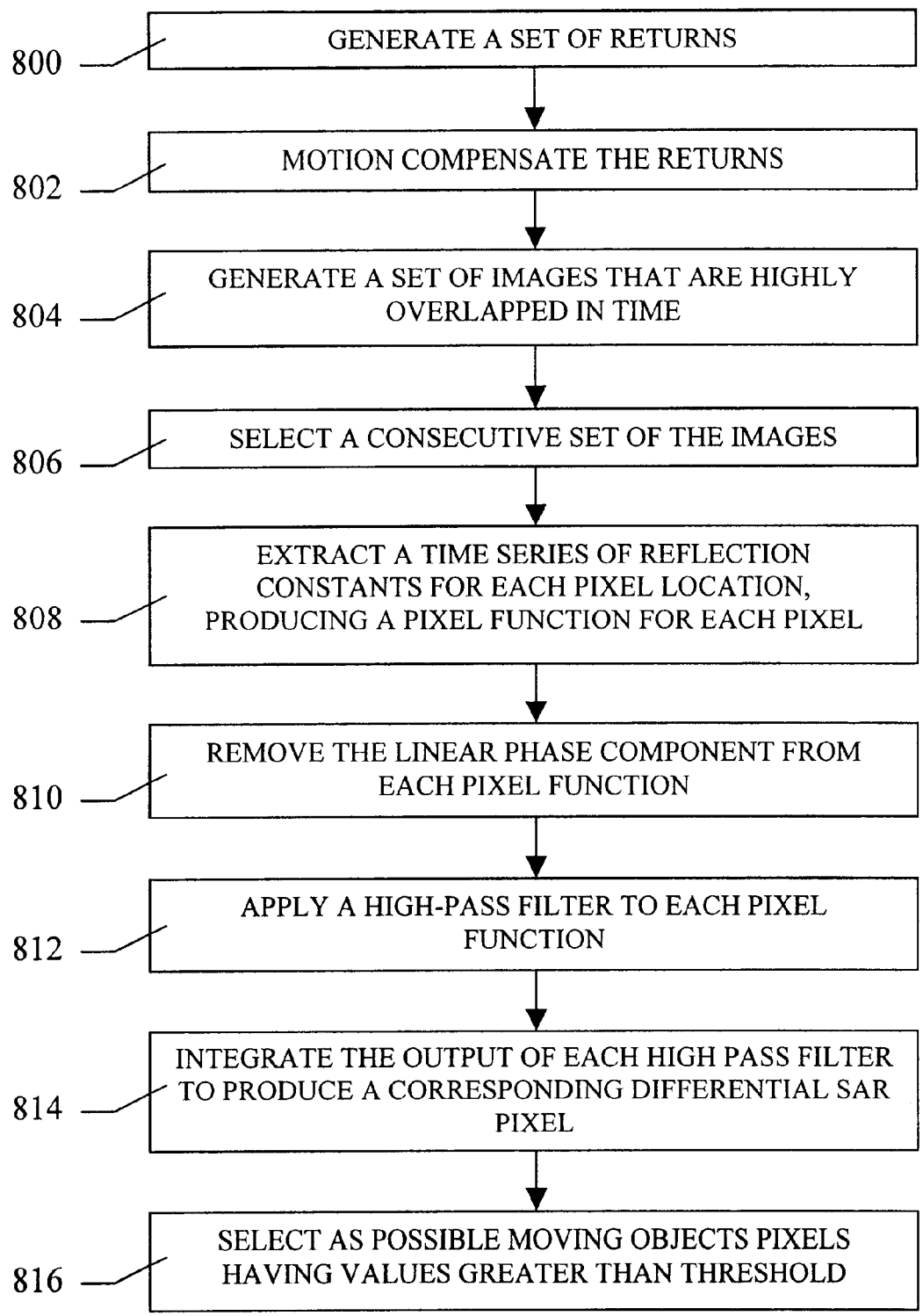
FIG. 8 is a flowchart illustrating a method of detecting moving targets using the radar system of the present invention.

FIG. 8 depicts a flowchart illustrating a method of detecting moving targets using the radar system of the present invention. This flowchart illustrates a process for detecting moving targets of simple geometries from stationary objects.

In step 800, a set of returns are generated. The returns are the reflected pulses which are digitized, thereby resulting in a large data set. In step 802, the entire data set is motion compensated. In step 804, a sequence of highly overlapping images is formed.

Then next step is to analyze the overlapping images to detect moving targets. In step 806, a set of consecutive overlapping images is selected. This set will be used to look for any moving targets. Each pixel location in an image is represented by a reflection constant that is associated with a spatial location. The reflection constants are represented by complex numbers. In step 808, a time series of reflection constants associated with a specific pixel in the overlapping images is extracted. One time series is extract for each pixel location. Each time series (also can referred to as a "pixel time series", or a "pixel function") describes the temporal changes associated with a particular pixel in the image sequence.

Assuming the aircraft is moving at a constant velocity, a stationary point scatterer at $x_t$ will have a linear phase pixel function with a constant amplitude, and a moving point scatterer will have a quadratic or higher order polynomial phase pixel function. The pixel time series for a moving point scatterer has a slow varying amplitude modulation, because the scatterer has to move from one pixel into another in the overlapping image sequence. The signal model for stationary and moving objects with complex geometries is constructed based on a summation of responses from stationary and moving point scatterers.

In step 808, a pixel function is produced for each pixel in the images. The pixel function can be represented by a time series of reflection constants. A stationary point scatter will have a linear phase pixel function with constant amplitude, and a moving point scatterer will have a quadratic or higher order polynomial phase pixel function. In step 810, the linear phase component from each pixel function is removed.

In step 812, a each pixel function is filtered by a high-pass filter. For example, an FIR filter with the coefficients [1–1] can be applied to the resultant pixel function time series. This represents a first order derivative differential operator, or successive subtraction. Alternatively, an FIR filter with the coefficients [1–21] could be applied to the resultant pixel function time series. This represents a second order differential operator.

In step 814, after each pixel function is filtered by the high pass filter, the resulting function is integrated to produce a single numerical value which will be referred to herein as the "pixel value" corresponding to the pixel function. The higher the pixel value, the more likely that the object in the image corresponding to the pixel is moving. In step 816, any pixel with a pixel value higher than a predetermined threshold will be identified as belonging to a potentially moving object. Additional techniques can be applied to eliminate false moving targets from the list of potential moving targets.

An image can be formed using the pixel values for each pixel thus calculated, wherein the pixel value determines the intensity of the corresponding pixel. Moving objects will thus be shown by areas with high pixel values.

In lieu of steps 812–816, more advanced algorithms for detecting complex moving objects amid complex stationary objects can be used. As an example of such an algorithm, the time-frequency distribution of the resultant pixel function can be computed. The time-frequency distribution is analyzed to determine the coherence of any time varying frequency lines. This analysis is used to reveal moving targets within the pixel. Next, the complex-valued spectral correlation coefficient is computed as a function of a overlapping moving data windows between neighboring pixel time series. The correlation between different stationary objects located in neighboring pixels should be low, while for an object that has moved from one pixel to the next the correlation should be high.

The algorithms described above are non-parametric. Parametric Maximum Likelihood Estimator algorithms would optimally estimate the motion parameters ($\alpha$, $\beta$, $\gamma$) associated with each pixel function, and the estimated values could be used to distinguish moving targets from stationary objects.

The method of processing the digitized data of the present invention for detecting moving ground targets, depicted in FIGS. 5–8, can be performed by a software module that is invoked after the data is collected from the radar returns. Thus, an existing radar system can be used to perform the moving target detection method of the present invention, by using software of the present invention to process the data received by the radar. The processing parameters that are used by the software can be optimized or adjusted after the data has already been collected. Parameters include the amount of overlap between images, the threshold for detecting moving targets, etc. Thus the parameters can be adjusted independently of any constraints on the radar operation. This offers flexibility in processing the data.

Signal Model for a Moving Target With Ground Clutter

Figure 9:
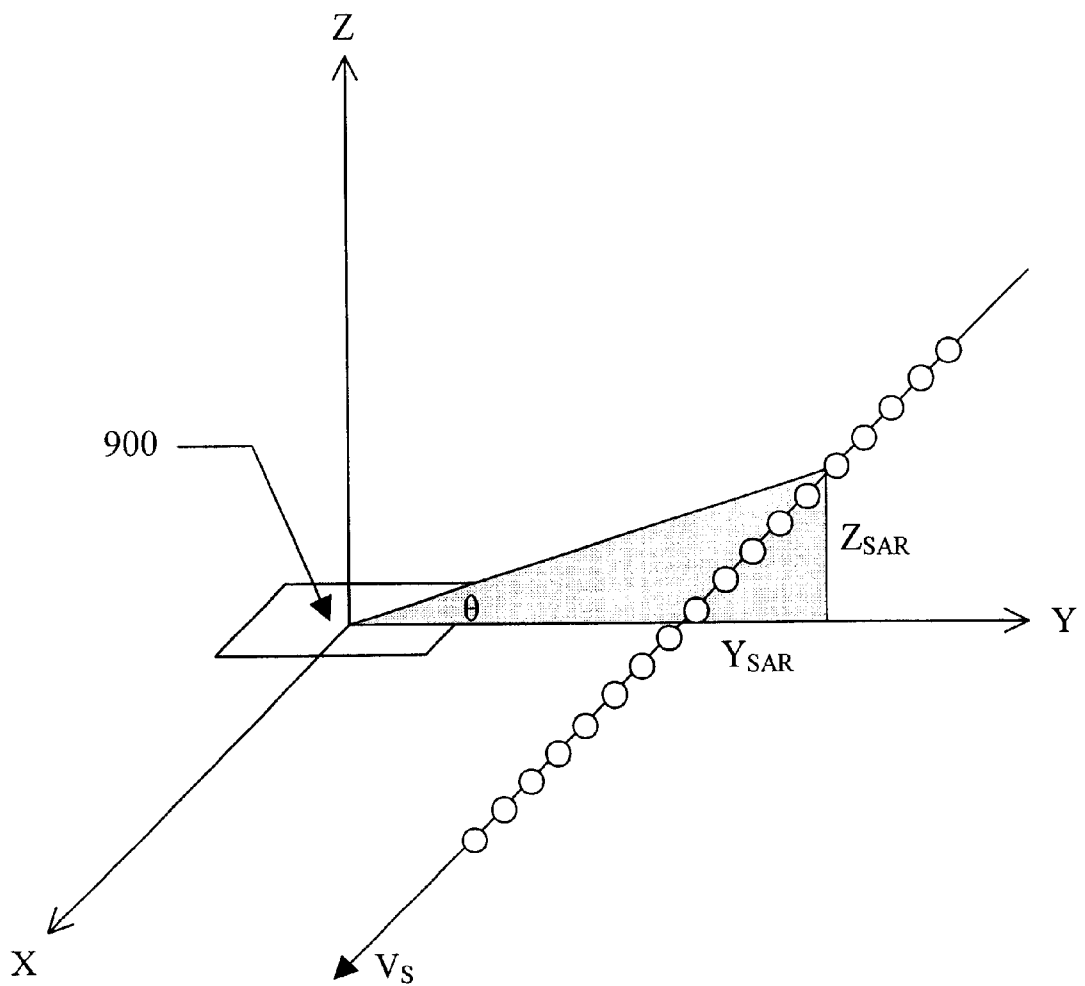
FIG. 9 illustrates the geometry of the signal model.

A signal model for a moving target with ground clutter will now be described. This model will describe a synthetic aperture radar (SAR) system embodiment of the present invention. The geometry of the signal model is described with respect to FIG. 9 as follows:

1. The center 900 of the imaged scene is the origin.
2. The SAR transmits at ($x_m$, $Y_{SAR}$, $Z_{SAR}$) and receives at ($x'_m$, $Y_{SAR}$, $Z_{SAR}$).
3. The altitude is $Z_{SAR}$, and the ground distance is $Y_{SAR}$.
4. The grazing angle is $$\theta = \tan^{-1}\left\{\frac{Z_{SAR}}{Y_{SAR}} - y_n\right\}.$$

5. The pulse repetition frequency is PRF, and the inter-pulse period is T.
6. The start of time, t=0, is when $x_m$=0, where $x_m = v_s mT$, $v_s$=SAR velocity, and
m is an index from [$-\infty$ ..., $-2$, $-1$, $0$, $1$, $2$, $3$, ... $\infty$].

$R_{mn}$ is the round trip distance from the transmit location, to (x, y, z) and back to the receive location. The subscripts denote the $m^{th}$ pulse and $n^{th}$ range gate.

$$R_{mn} = \sqrt{(x_m - x)^2 + (Y_{SAR} - y)^2 + (Z_{SAR} - z)^2} + \sqrt{(x'_m - x)^2 + (Y_{SAR} - y)^2 + (Z_{SAR} - z)^2} \quad \text{(EQ 1)}$$

$$R_{mn} \approx 2\sqrt{(x_m - x)^2 + (Y_{SAR} - y)^2 + (Z_{SAR} - z)^2} + 2(x_m - x)\left(\frac{v_s}{c}\right) + 2R_n\left(\frac{v_s}{c}\right)^2$$

where (EQ 1)

$$R_n = \sqrt{(Y_{SAR} - y_n)^2 + Z_{SAR}^2}.$$

The difference in transmit and receive positions induces a small shift in the image position of the object at (x, y). This term in (EQ 1) is dropped from consideration in the immediate discussion that follows, but it will be included in a later discussion of DPCA (displaced phase center antenna). The last term is a small constant phase shift that depends on $R_n$, it is dropped from further consideration.

SAR Image Formation

The signal reflected from (x, y) has the phase delay $\exp(-jkR_{mn})$, where $$R_{mn}(x) \approx 2R_n + R_n\left(\frac{x_m}{R_n}\right)^2 - \frac{2x_m x}{R_n} + R_n\left(\frac{x}{R_n}\right)^2. \quad \text{(EQ 2)}$$

The $m^{th}$ received signal from (x, y) after range compression and range gate alignment is:

$$\sigma(x, y)\exp\{-jkR_{mn}\}h\left(n\Delta t - \frac{R_n}{c}\right)\exp\{j\omega n\Delta t\}, \quad \text{(EQ 3)}$$

where $\sigma$ is the reflectance at (x, y), k is the wavenumber, $n\Delta t$ denotes the $n^{th}$ sample point along the fast time dimension, and $\omega$ is the RF frequency in radian per second. The factor $h(n\Delta t - R_n/c) \exp\{j\omega n\Delta t\}$ is dropped for clarity.

The signal reflected by all the clutter from a particular down range, $R_n$, is the sum of the reflections from Q point scatterers, $$[S_m]_{range\ migration\ compensated} = \sum_{q=1}^{Q} \sigma(x_q)\exp\{-jkR_{mn}(x_q)\}. \quad \text{(EQ 4)}$$

Expanding this expression gives:

$$[S_m]_{range\ migration\ compensated} = \quad \text{(EQ 5)}$$

$$\{-j2kR_n\}\sum_{q=1}^{Q}\sigma(x_q)\exp\left\{-jkR_n\left(\frac{x_q}{R_n}\right)^2\right\}\exp\left\{+jk\frac{2x_m x_q}{R_n}\right\}\exp\left\{-jkR_n\left(\frac{x_m}{R_n}\right)^2\right\}.$$

The components of the phase function that do not depend on the index m are absorbed into $\sigma(x_q)$ to yield:

$$[S_m]_{\text{range migration compensated}} = \quad (EQ\ 6)$$

$$\sum_{q=1}^{Q} \sigma(x_q)\exp\left\{+jk\frac{2x_m x_q}{R_n}\right\}\exp\left\{-jkR_n\left(\frac{x_m}{R_n}\right)^2\right\}$$

The quadratic phase term in $x_m$ is compensated by a motion compensation algorithm and the result is:

$$[S_m]_{\text{range migration compensated}} = [S_m]_{mc} = \sum_{q=1}^{Q} \sigma(x_q)\exp\left\{+jk\frac{2x_m x_q}{R_n}\right\}. \quad (EQ\ 7)$$

The image formation processing described in the above may be denoted as stripmap mode. Thus the maximum cross range resolution is D/2, where D is the real antenna aperture. This determines the maximum number of points that may be used, or the maximum integration time. The spotlight mode does not impose this restriction, but it requires the appropriate motion compensation algorithms. In that case the basic point illustrated by (EQ 5–7) still holds, which is that lower resolution but spatially registered SAR images can be obtained by computing the Fourier transforms of overlapping segments of $[S_m]_{mc}$, the motion compensated data for a higher resolution SAR image.

The Difference Between Successive SAR Images

The output of SAR at the image pixel located at $x=x_p$ is:

$$\sigma(x_p) = \frac{1}{\sqrt{M}} \sum_{m=1}^{M} [S_m]_{mc}\exp\left\{-jk\frac{2mv_s T}{R_n}x_p\right\}, \quad (EQ\ 8)$$

$$\sigma(x_p)_{\Delta M} = \frac{1}{\sqrt{M}} \sum_{m=1+\Delta M}^{M+\Delta M} [S_m]_{mc}\exp\left\{-jk\frac{2mv_s T}{R_n}x_p\right\} \quad (EQ\ 9)$$

where M denotes the number of data points, $v_s$ the sensor velocity, T is the interpulse period, and $R_n$ is the $n^{th}$ range. The pixel value as a function of M, and a delay of $\Delta M$ data points is:

$$\sigma(x_p) \approx \exp\left\{-j2k\frac{\Delta M v_s T}{R_n}x_p\right\}\sigma(x_p)_{\Delta M}. \quad (EQ\ 10)$$

$$\exp\left\{-j2k\frac{\Delta M v_s T}{R_n}x_p\right\}\sigma(x_p)_{\Delta M} - \sigma(x_p) \approx 0 \quad (EQ\ 11)$$

If $\Delta M$ was zero, then the output of DSAR would be zero. The optimal selection of $\Delta M$ is based on maximizing the signal to clutter ratio. The amount of suppression is denoted by $G_c$, the clutter suppression signal processing gain. It is a function of $\sigma(x_q)$, M, $\Delta M$, and the estimated value of $G_c$ at the pixel would be one of the parameters that enter into to a decision process to distinguish between stationary clutter and moving target.

Another parameter that should be included in the decision process is $\sigma(x_p)$, which should be higher than a threshold level above the system noise level.

Moving Target and Stationary Clutter

The following describes a data model for a moving target embedded in stationary clutter. From (EQ 2), $R_{mn}$ for a point target moving on a path described by:

$\{x_t(m), y_n + y_t(m), z_t(m)\}$ is $$R_{mn} \approx 2R_n + \frac{(x_m)^2}{R_n} - \frac{2x_m x_t(m)}{R_n} + \quad (EQ\ 12)$$

$$\frac{\{x_t(m)\}^2 + \{y_t(m)\}^2 + \{z_t(m)\}^2}{R_n} - 2\cos\theta y_t(m) - 2\sin\theta z_t(m),$$

and:

$$x_t(m) = x_{to} + v_x mT + \frac{1}{2}a_x(mT)^2,$$

$$y_t(m) = y_{to} + v_y mT + \frac{1}{2}a_y(mT)^2,$$

$$z_t(m) = z_{to} + v_z mT + \frac{1}{2}a_z(mT)^2,$$

Where $\theta$ is the grazing angle for $y_n$, and $\{v_x, v_y, v_z\}$ and $\{a_x, a_y, a_z\}$ are the velocity and acceleration components. The motion compensated data is:

$$[S_m]_{mc} = \sigma_t \exp\{-jkR_{mn}(x_t)\} \quad (EQ\ 13)$$

$$= \sigma_t \exp\left\{+jk\left\{\frac{2x_m x_t(m)}{R_n} - \frac{(x_t)^2 + (y_t)^2 + (z_t)^2}{R_n} + \right.\right.$$

$$= 2\cos\theta y_t(m) + 2\sin\theta z_t(m)\}\}$$

where $\sigma_t$ is the target cross section. Expanding (EQ 4–13) yields in:

$$[S_m]_{mc} = \sigma_t \exp\left\{+j\phi_o + jk\frac{2x_m x_t'}{R_n} + jk\alpha(mT)^2 + \right. \quad (EQ\ 14)$$

$$jk\beta(mT)^3 + jk\gamma(mT)^4\},$$

$$\phi_o = k\left\{-\frac{(x_{to})^2 + (y_{to})^2 + (z_{to})^2}{R_n} + 2y_{to}\cos\theta + 2z_{to}\sin\theta\right\},$$

$$x_t' = x_{to} - \frac{x_{to}v_x + y_{to}v_y + z_{to}v_z}{v_s} + \frac{R_n}{v_s}(v_y\cos\theta + v_z\sin\theta),$$

$$\alpha = \frac{2v_s v_x - v_x v_x - v_y v_y - v_z v_z - x_{to}a_x - y_{to}a_y - z_{to}a_z}{R_n} +$$

$$a_y\cos\theta + a_z\sin\theta$$

$$\beta = -\frac{v_x a_x + v_y a_y + v_z a_z}{R_n} \approx 0, \text{ and}$$

$$\gamma = -\frac{(a_x)^2 + (a_y)^2 + (a_z)^2}{4R_n} \approx 0.$$

The constant $\phi_0$ is absorbed into $\sigma_t$.

Finally, the data model for a moving target embedded in stationary clutter at the $n^{th}$ range gate is approximated by $$[S_m]_{mc} \approx \sigma_t \exp\left\{+jk\frac{2x_m x_t'}{R_n}\right\}\exp\{+jk\alpha(mT)^2\} + \quad (EQ\ 15)$$

$$\sum_{q=1}^{Q}\sigma(x_q)\exp\left\{+jk\frac{2x_m x_q}{R_n}\right\}$$

$$x_t' \approx x_{to}\left(1 - \frac{v_x}{v_s}\right) + \frac{R_n}{v_s}(v_y\cos\theta + v_z\sin\theta), \text{ and}$$

$$\alpha \approx \frac{2v_s v_x - x_{to}a_x}{R_n} + a_y\cos\theta + a_z\sin\theta.$$

The basic signal model for the temporal changes in a sequence of motion compensated SAR images is described by (EQ 15), which shows that $x_t'$, the effective location of the target, is a function of the velocity components $(v_x, v_y, v_z)$. The phase associated with the target's data is quadratic and a function of $(v_x, a_x, a_y, a_z)$.

The Fourier coefficients of $[S_m]_{mc}$ have two components, a non-stationary stochastic component, and a narrow band stationary stochastic component. The non-stationary component contains the parameter $\alpha$, which give arise to a quadratic phase, if the motion parameters ($v_x, a_x, a_y, a_z$) were constants as functions of the index m. Otherwise $\alpha$ would be a function of the index m.

Conclusion

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. A method for detecting a moving target, comprising:
   detecting radiation reflected off of a target or emitted by a target;
   digitizing the detected radiation, resulting in a set of data returns;
   applying motion compensation to the entire set of data returns;
   selecting a plurality of blocks of the motion compensated data that are highly overlapping in time;
   generating a plurality of images from the plurality of blocks of motion compensated data;
   selecting a consecutive set of the plurality of images; and
   identifying moving objects represented within the consecutive set of images.

2. The method of claim 1, further comprising:
   generating a set of returns for a scene by repeatedly illuminating the scene using a single moving source and receiving a set of return signals.

3. The method of claim 1, wherein the motion compensation comprises:
   compensating the returns for changes in range resulting from the relative radial motion of the source and the scene, producing a motion compensated data set.

4. The method of claim 1, wherein the radiation is detected by a single receive phase center.

5. The method of claim 4, wherein the size of the set of data returns is from about the same size to twice as large as the nominal data block size for forming a high resolution SAR image.

6. A method for detecting a moving target, the method comprising:
   detecting radiation reflected off of a target or emitted by a target;
   digitizing the detected radiation resulting in a set of data returns;
   applying motion compensation to the entire set of data returns:
   selecting a plurality of blocks of the motion compensated data that are highly overlapping in time;
   generating a plurality of images from the plurality of blocks of motion compensated data;
   selecting a consecutive set of the plurality of images; and
   identifying moving objects represented within the consecutive set of images;
   wherein the step of identifying moving objects comprises:
   extracting a time series of reflection coefficients for at least some of the pixel locations of the consecutive set of images;
   producing a pixel function for each pixel, thereby representing the consecutive set of images by a collection of pixel functions;
   removing the linear phase component from each pixel function, producing phase compensated pixel functions;
   applying a high pass filter to each phase compensated pixel function; and
   integrating the output of each filtered pixel function to produce a corresponding pixel value.

7. The method of claim 6, further comprising:
   selecting as possible moving objects pixels with pixel values greater than a pre-determined threshold.

8. A system for detecting moving targets, comprising:
   a radar having a single receive phase center receiving radiation and generating a data set representing the received radiation;
   a motion compensation element for motion compensating the entire data set;
   a moving target detect element:
   selecting a plurality of blocks of the motion compensated data that are highly overlapping in time,
   generating a plurality of images from the plurality of blocks of motion compensated data,
   identifying moving objects represented within the plurality of images.

9. A method for detecting a moving object, the method comprising:
   receiving a signal from a target;
   forming a first set of data based on at least information associated with the received signal;
   performing a motion compensation to the entire first set of data to form a second set of motion compensated data;
   forming at least a first subset of motion compensated data and a second subset of motion compensated date, the first subset of motion compensated data being a first part of the second set of motion compensated data, the second subset of motion compensated data being a second part of the second set of motion compensated data, the first subset and the second subset overlapping in time;
   generating at least a first image and a second image based on at least information associated with the first subset and the second subset respectively; and
   identifying a moving object based on at least information associated with the first image and the second image; wherein
   the performing motion compensation to the entire first set of data is free from dividing the first set of data into at least a third subset of data and a fourth subset of data, the third subset and the fourth subset overlapping in time.

10. The method of claim 9 wherein the performing a motion compensation to the entire first set of data is free from performing a first motion compensation to the third subset of data and performing a second motion compensation to the fourth subset of data, the first motion compensation and the second motion compensation being different.

11. The method of claim 9 wherein the first image and the second image have phase coherency in response to at least the performing motion compensation to the entire first set of data.

12. The method of claim 9 wherein the identifying a moving object based on at least information associated with the first image and the second image comprises associating a first parameter of the first image and a second parameter of the second image, wherein the first parameter is based on at least a first phase of the first image, and the second parameter is based on at least a second phase of the second image.

13. The method of claim 12 wherein the first parameter comprises a first reflection coefficient and the second parameter comprises a second reflection coefficient, the first reflection coefficient equal to a first complex number, the second reflection coefficient equal to a second complex number.

14. The method of claim 13 wherein the associating a first parameter of the first image and a second parameter of the second image comprises forming at least a first pixel function.

15. The method of claim 14 wherein for a stationary point the first pixel function is a linear function.

16. The method of claim 14 wherein for a moving point the first pixel function is an nth-order polynomial function, n being an integer larger than one.

17. The method of claim 14 wherein the identifying a moving object is based on at least information associated with the first pixel function and information associated with phase coherency of the first image and the second image in response to at least the performing a motion compensation to the entire first set of data.

18. The method of claim 9 wherein the receiving a signal from a target is performed by only one antenna.

19. A system for detecting a moving object, the system comprising:
  an antenna configured to receive a signal from a target and form a first set of data based on at least information associated to the received signal;
  a motion compensation system configured to perform a motion compensation on the entire first set of data and form a second set of motion compensated data;
  a moving object detection system configured to
    form at least a first subset of motion compensated data and a second subset of motion compensated date, the first subset of motion compensated data being a first part of the second set of motion compensated data, the second subset of motion compensated data being a second part of the second set of motion compensated data, the first subset and the second subset overlapping in time;
    generate at least a first image and a second image based on at least information associated with the first subset and the second subset respectively; and
    identify a moving object based on at least information associated with the first image and the second image; wherein
      the perform a motion compensation on the entire first set of data is free from dividing the first set of data into at least a third subset of data and a fourth subset of data, the third subset and the fourth subset overlapping in time.

* * * * *

UNITED STATES PATENT AND TRADEMARK OFFICE
CERTIFICATE OF CORRECTION

PATENT NO. : 6,697,010 B1
DATED : February 24, 2004
INVENTOR(S) : Lawrence K. Lam It is certified that error appears in the above-identified patent and that said Letters Patent is hereby corrected as shown below:

Drawings,
Figure 4, -- PRIOR ART -- should be added.

Column 12,
Line 16, "where (EQ 1)" should read -- where --.
Lines 57-63,

" $[S_m]_{range\ migration\ compensated} =$ $\{-j2kR_n\}\sum_{q=1}^{Q}\sigma(x_q)\exp\{-jkR_n(\frac{x_q}{R_n})^2\}\exp\{+jk\frac{2x_m x_q}{R_n}\}\exp\{-jkR_n(\frac{x_m}{R_n})^2\}.$ " should read -- $[S_m]_{range\ migration\ compensated}$ $= \exp\{-j2kR_n\}\sum_{q=1}^{Q}\sigma(x_q)\exp\{-jkR_n(\frac{x_q}{R_n})^2\}\exp\{+jk\frac{2x_m x_q}{R_n}\}\exp\{-jkR_n(\frac{x_m}{R_n})^2\}.$ --.

Column 13,
Lines 30-52, delete

" $\sigma(x_p) = \frac{1}{\sqrt{M}}\sum_{m=1}^{M}[S_m]_{mc}\exp\{-jk\frac{2mv_sT}{R_n}x_p\}.$ (EQ 8)

$\sigma(x_p)_{\Delta M} = \frac{1}{\sqrt{M}}\sum_{m=1+\Delta M}^{M+\Delta M}[S_m]_{mc}\exp\{-jk\frac{2mv_sT}{R_n}x_p\}$ (EQ 9)

where M denotes the number of data points, $v_s$ the sensor velocity, T is the interpulse period, and $R_n$ is the $n^{th}$ range. The pixel value as a function of M, and a delay of ΔM data points is:

$\sigma(x_p) \approx \exp\{-j2k\frac{\Delta M v_s T}{R_n}x_p\}\sigma(x_p)_{\Delta M}.$ (EQ 10)

$\exp\{-j2k\frac{\Delta M v_s T}{R_n}x_p\}\sigma(x_p)_{\Delta M} - \sigma(x_p) \approx 0$ (EQ 11) ".

Signed and Sealed this

Fourteenth Day of September, 2004

JON W. DUDAS
*Director of the United States Patent and Trademark Office*